United States Patent
Labrogere et al.

(10) Patent No.: US 9,390,187 B2
(45) Date of Patent: Jul. 12, 2016

(54) METHOD FOR ENRICHING CONTENT OF A WEB PAGE WITH PRESENCE INFORMATION

(75) Inventors: Paul Labrogere, Nozay (FR); Vincent Billault, Nozay (FR); Nicolas Bouche, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1235 days.

(21) Appl. No.: 12/675,251

(22) PCT Filed: Aug. 20, 2008

(86) PCT No.: PCT/EP2008/060890
§ 371 (c)(1),
(2), (4) Date: May 13, 2011

(87) PCT Pub. No.: WO2009/027287
PCT Pub. Date: Mar. 5, 2009

(65) Prior Publication Data
US 2011/0208799 A1 Aug. 25, 2011

(30) Foreign Application Priority Data
Aug. 31, 2007 (EP) .................................... 07291053

(51) Int. Cl.
H04L 29/06 (2006.01)
G06F 17/30 (2006.01)
H04L 29/08 (2006.01)

(52) U.S. Cl.
CPC .... *G06F 17/30887* (2013.01); *G06F 17/30893* (2013.01); *H04L 67/02* (2013.01); *H04L 67/24* (2013.01); *H04L 65/1016* (2013.01)

(58) Field of Classification Search
CPC ....................................................... H04L 69/24
USPC ......................................... 709/203; 715/713
See application file for complete search history.

(56) References Cited

U.S. PATENT DOCUMENTS 6,208,995 B1 * 3/2001 Himmel et al.
6,405,192 B1 * 6/2002 Brown et al. ................. 707/722
(Continued)

FOREIGN PATENT DOCUMENTS

EP 1 536 361 A 6/2005
EP 1 773 019 A 4/2007
(Continued)

OTHER PUBLICATIONS

Rosenberg Cisco Systems J.: :Obtaining and Using Globally Routable User Agent (UA) URIs (GRUU) in the Session Initiation Protocol (SIP); draft-ieft-sip-gruu-06.txt, IETF Standard_Working_Draft, Internet Engineering Task Force, IETF, CH, Vo. Sip, No. 6, pp. 1-41, XP015042701, Oct. 20, 2005.
(Continued)

*Primary Examiner* — Asghar Bilgrami
(74) *Attorney, Agent, or Firm* — Fay Sharpe, LLP

(57) ABSTRACT

Method for enriching content of a web page (2) displayed for a user on a computer (3) connected to a computerized network (5) and provided with a web browser (4), said method comprising the steps of: the web browser (4) sending a request for a web page (2) to a distant web server (6), upon receipt of the web page (2) from the web server (6), the web browser (4) parsing the web page (2) for contact information, upon detection of contact information within the web page (2), the web browser (4) sending a request for presence information (8) associated with said contact information to at least one presence server (7), upon receipt of the presence information (8) from the presence server(s) (7), the web browser (4) displaying the web page (2) on the computer (3) together with the presence information (8).

10 Claims, 3 Drawing Sheets

(56) References Cited

U.S. PATENT DOCUMENTS

| | | | |
|---|---|---|---|
| 6,415,319 B1* | 7/2002 | Ambroziak | 709/219 |
| 2002/0120714 A1* | 8/2002 | Agapiev | 709/218 |
| 2006/0018272 A1 | 1/2006 | Mutikainen et al. | |
| 2006/0195474 A1 | 8/2006 | Cadiz et al. | |
| 2007/0244900 A1* | 10/2007 | Hopkins et al. | 707/10 |
| 2007/0293212 A1* | 12/2007 | Quon et al. | 455/420 |
| 2008/0199155 A1* | 8/2008 | Hagens et al. | 386/124 |
| 2008/0205625 A1* | 8/2008 | Mandalia et al. | 379/265.02 |
| 2009/0019367 A1* | 1/2009 | Cavagnari et al. | 715/716 |
| 2010/0281364 A1* | 11/2010 | Sidman | 715/713 |

FOREIGN PATENT DOCUMENTS

| | | |
|---|---|---|
| GB | 2 329 046 A | 3/1999 |
| JP | 2002279141 A | 9/2002 |
| JP | 2003274047 A | 9/2003 |
| JP | 2005110214 A | 4/2005 |
| JP | 2005202869 A | 7/2005 |
| JP | 2006146911 A | 6/2006 |
| JP | 2006236320 A | 9/2006 |

OTHER PUBLICATIONS

Mark Schiefelbein: "A Backbase Ajax Front-End for J2EE Applications," Internet Citation, Online, pp. 1-16, XP002442353, Aug. 29, 2005.

International Search Report.

Japanese Office Action—Final Rejection and translation; Drafting Date Feb. 1, 2013; Dispatch Date Feb. 5, 2013; 5 pgs.

* cited by examiner

METHOD FOR ENRICHING CONTENT OF A WEB PAGE WITH PRESENCE INFORMATION

FIELD OF THE INVENTION

The invention relates to a method for enriching content of a web page displayed for a user on a computer connected to a computerized network.

BACKGROUND OF THE INVENTION

Since its commercial beginnings in the early 1990s, the Internet has quickly spread throughout the world and is nowadays widely used as an everyday tool in the most advanced regions.

Almost everyone is now familiar with the World Wide Web, one of the most popular services provided in the Internet, allowing the user to download and display web pages on his computer, provided that the latter is connected to the Web and equipped with a suitable software application called a web browser using the HyperText Transfer Protocol (HTTP), some of the most known being Microsoft Internet Explorer® or Mozilla Firefox®.

Basically, the user inputs the address (or activates a corresponding hyperlink), called Uniform Resource Locator (URL), of the web page he wishes to access to, like http://www.websitename.com/webpage, http://meaning that HTTP is the protocol to be used by the web browser, www.websitename.com being the name of the web server where the web page is hosted and /webpage the location of the targeted web page within the web server.

The web browser sends the request for the web page to the web server, which upon reception of the request retrieves the web page, generally under the form of a text file written in a web browser-readable language such as the HyperText Markup Language (HTML), and returns it to the web browser. The web browser then displays the web page, according to the page layout defined in the HTML file.

Most web pages include contact information such as email addresses, telephone or fax numbers, allowing the user to get information about possible correspondents he may contact in order to access further information or services. Such contact information may be presented in the form of Uniform Resource Identifiers (URIs). A URI, as defined by the Internet Engineering Task Force (IETF) in RFC3986 standard of January 2005, is a "compact sequence of characters that identifies an abstract or physical resource".

RFC3986 provides the following examples to illustrate several URI schemes and variations in their syntax components:
ftp://ftp.is.co.za/rfc/rfc1808.txt
http://www.ietf.org/rfc/rfc2396.txt
ldap://[2001:db8::7]/c=GB?objectClass?one
mailto:John.Doe@example.com
news:comp.infosystems.www.servers.unix
tel:+1-816-555-1212
telnet://192.0.2. 16:80
urn:oasis:names:specification:docbook:dtd:xml:4.1.2

The mailto and tel URIs are peculiar with respect of other URIs, for they generally point to resources (which are generally human, although tel may point to a contact center and mailto to an automatic email system) whom the user may wish to contact directly in a peer-to-peer (P2P) communication session.

A new network architecture recently appeared, called Internet Protocol Multimedia Subsystem (IMS), allowing the merging of data and speech within same communication sessions. IMS is based on the specification of Session Initiation Protocol (SIP) as an application layer protocol that is used for establishing, modifying and terminating multimedia sessions in an Internet Protocol (IP) network (see e.g. Poikselkä et al, *The IMS, IP Multimedia Concepts and Services*, Wiley, $2^{nd}$ edition, 2006).

SIP is becoming the standard for establishing Voice over IP (VoIP) communication sessions. It requires that a user agent (UA) of a caller terminal (such as a computer implemented with a VoIP application) be informed of a specific URI, called SIP URI, of a recipient terminal. SIP URI, like mailto and tel URIs, is to be used in peer-to-peer communication session.

Syntax of SIP URIs is provided by IETF in RFC3261 standard of June 2002. RFC3261 provides the following example to illustrate a SIP URI:
sip:+658-555-1234567;postd=pp22@foo.com;user=phone There is evidence that most industrial efforts are being made to facilitate the merging of voice and data in common networks. However the question of how the users will apprehend and leverage the new functionalities is still pending. It will certainly depend upon how the information will be provided and made available.

An attempt has been made for optimizing delivery and deployment of web services to consumers by providing presence information in addition to business/technical information about different web service providers to the consumers so they can select a web service provider: see US patent application No. 2007/0083627 (Mohammed).

Another attempt has been made for enhancing customer assistance to Internet users, whereby a web server provides content to a web site, which includes presence information provided by an enterprise server, allowing online users to see in the current availability of real time customer support, see e.g. US patent application No. US 2005/0114159 (Ozugur).

Although these attempts enhance web services, they require important modifications of the network architecture on the server side, thereby preventing the new functionalities to be extended to any kind of web service on the client side.

SUMMARY OF THE INVENTION

It is one object of the invention to enrich content of web pages whereby the user is allowed to fully leverage the information he is provided with, at a large scale.

The invention includes a method for enriching content of a web page displayed for a user on a computer connected to a computerized network and provided with a web browser, said method comprising the steps of:
  the web browser sending a request for a web page to a distant web server,
  upon receipt of the web page from the web server, the web browser parsing the web page for contact information,
  upon detection of contact information within the web page, the web browser sending a request for presence information associated with said contact information to at least one presence server,
  upon receipt of the presence information from the presence server(s), the web browser displaying the web page on the computer together with the presence information.

The above and other objects and advantages of the invention will become apparent from the detailed description of preferred embodiments, considered in conjunction with the accompanying drawings.

DESCRIPTION OF PREFERRED EMBODIMENTS

Figure 1:
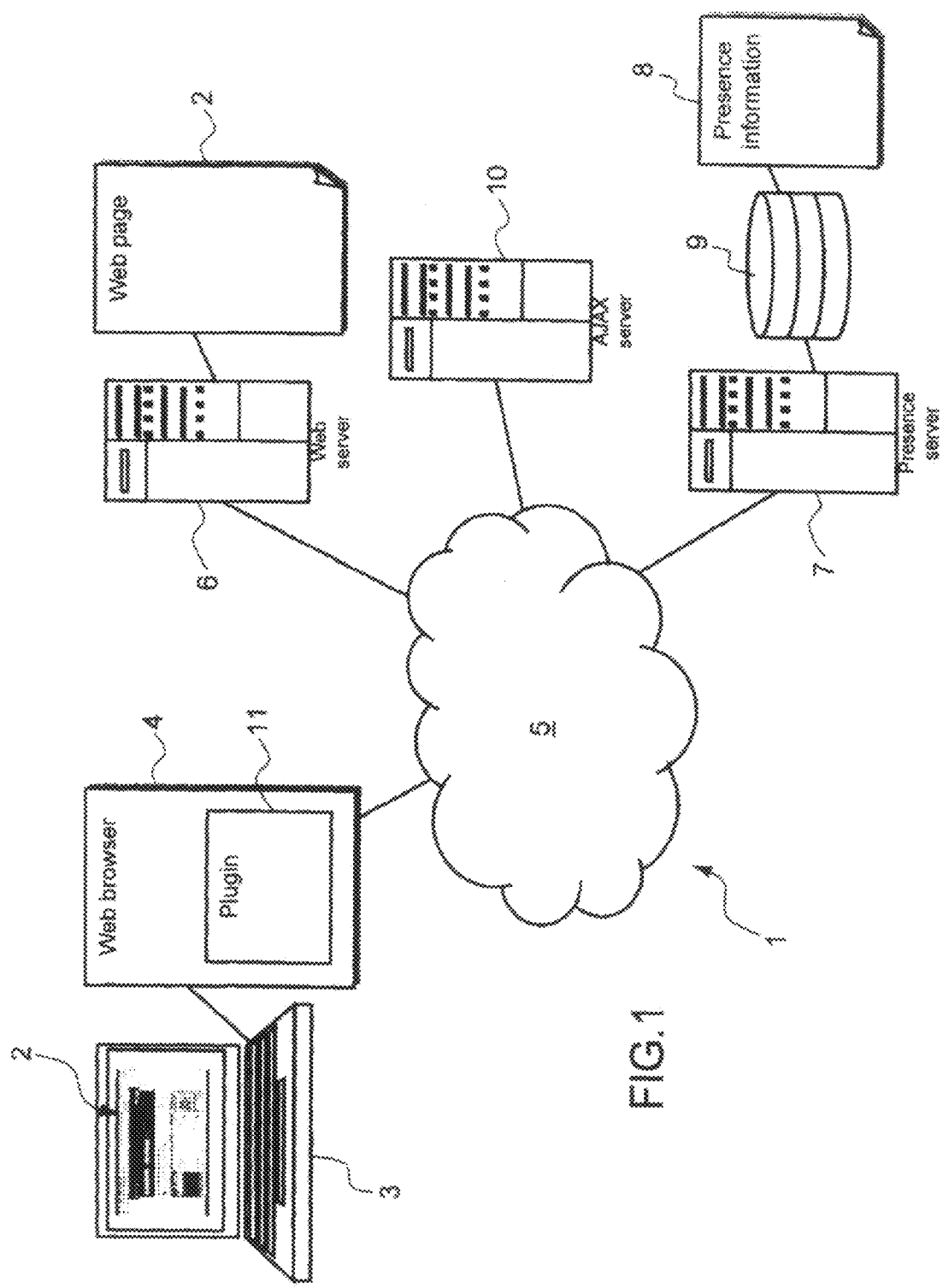
FIG. 1 is a diagram illustrating a computerized system configured for displaying enriched web pages.

Referring to FIG. 1, there is shown a communication system 1 configured for displaying enriched web pages 2. The communication system includes a computer device 3, i.e. an electronic device (such as a personal computer (PC)—which may be a laptop, as disclosed—, a Personal Digital Assistant (PDA), a Smartphone, a game station, etc.), provided with a screen and including a web browser 4 such as Microsoft Internet Explorer or Mozilla Firefox. Computer 3 is connected, for example through an (X)DSL link, to a network 5 which may be a Local Area Network (LAN), a Metropolitan Area Network (MAN), or (preferably) a Wide Area Network (WAN) such as the Internet.

The web browser 4 is compatible with HTML and preferably supports other Asynchronous Javascript And XML (AJAX) technologies, including Cascading Style Sheets (CCS) language, Document Object Model (DOM) and Javascript formats, XMLHttpRequest (XHR) interface, eXtensible Markup Language (XML) and eXtended Stylesheet Language Transformation (XSLT).

The communication system 1 also includes at least one distant web server 6, also connected to the network 5, including at least one web page 2 which the web server 6 can retrieve upon receipt of a suitable request from the web browser 4. The web server 6 may be a legacy server, meaning it does not necessarily include the latest web technologies.

The communication system 1 further includes at least one distant presence server 7 including presence information 8 associated with contact information within the web page 2. Presence information 8 may be memorized in a database 9. The presence server 7 is preferably part of an IMS server, configured for exchanging and managing SIP messages from and to the network 5.

The communication system 1 also preferably includes an AJAX server 10 to which the Javascript-enabled web browser 4 may connect through the network 5 for sending thereto a request for AJAX components enabling dynamic display of presence information within the web page 2 downloaded from the web server 6, as will be further disclosed hereinafter.

The web browser 4 (practically a computer program implemented on a processing unit of the computer 3) is configured for undertaking the following actions:
  sending a request for a web page 2 to the web server 6,
  upon receipt of the web page 2 from the web server 6, parsing the web page 2 for contact information, preferably under the form of URIs such as mailto (email address), tel (telephone and/or fax number) or SIP URI,
  upon detection of contact information within the web page 2, sending a request for presence information associated with said contact information to the corresponding presence server(s) 7,
  upon receipt of the presence information 8 from the presence server(s) 7, displaying the web page 2 on the computer 3 together with the presence information 8.

Such configuration of the web browser 4 may be implemented either in a native way, i.e. as an original component of the web browser program, or as a program plugin 11 which might be downloaded from a web site or executed from a computer-readable memory support such as a CD-ROM inserted in the computer 3 after the web browser 4 has already been installed, and comprising executable instructions corresponding to the actions disclosed hereabove.

Presence servers are generally programmed to recognize URIs. Therefore, in case the contact information within the web page 2 is not presented under the form of URI(s), the web browser 4 is preferably configured for forming URI(s) based upon the detected contact information, for inclusion in the request for presence information to be sent to the presence server(s) (7).

Figure 2:
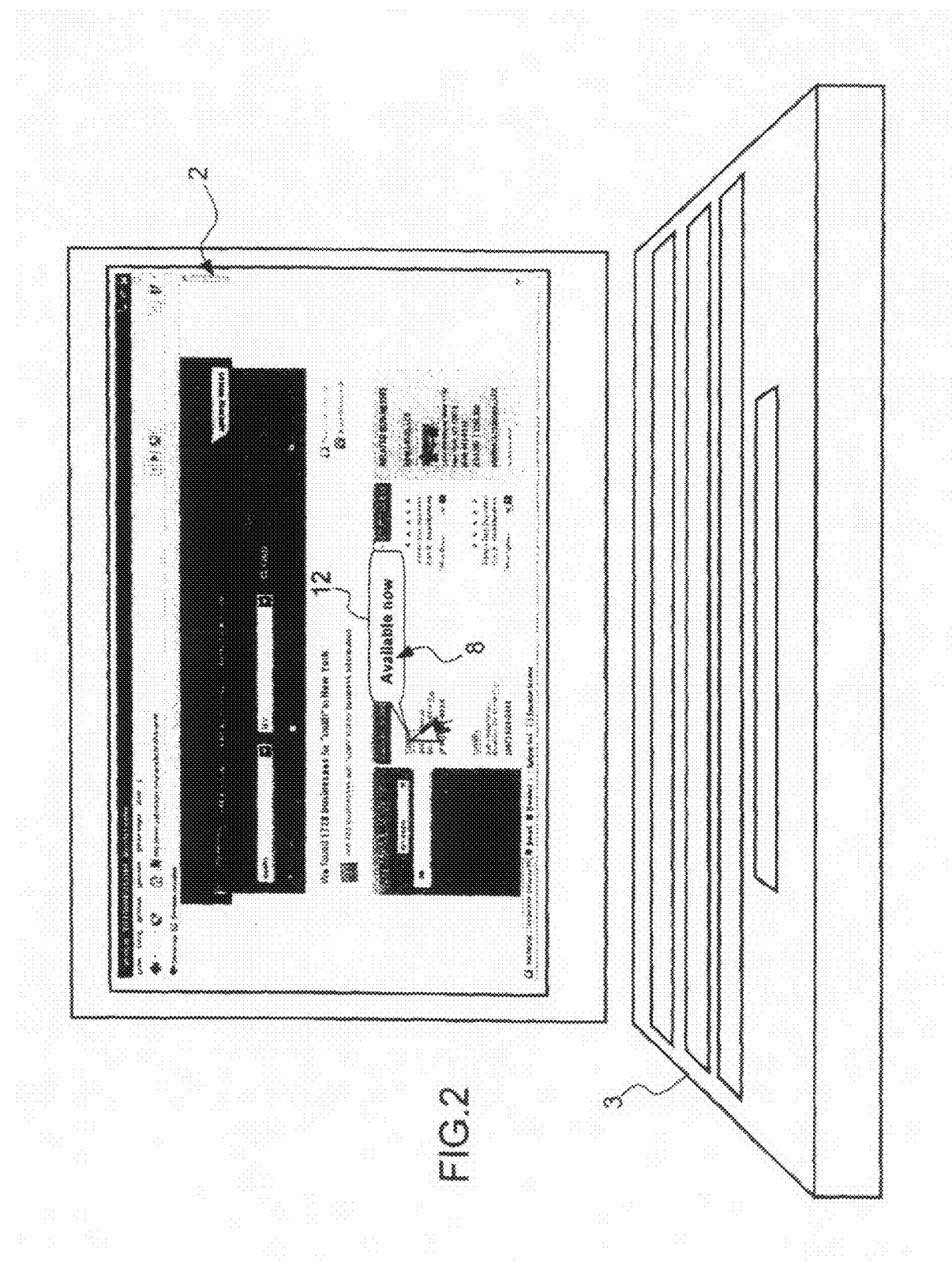
FIG. 2 is a diagrammatic view of a computer including a web browser configured for displaying enriched web pages.

As disclosed on FIG. 2, presence information 8 may be displayed to the user as a written presence message in a popup window 12 activated by a mouse effect such as OnMouseOver or Onclick on the text or image providing contact information within the web page 2. The presence message may provide simple information as "available now" or "presently unavailable". It may provide more complex information which may be time-related, e.g. giving an estimated time before the recipient terminal will be available, such as "available in X minutes". The presence message may also be enriched with hyperlinks allowing the user to undertake an action upon reading the message. For example, the presence message may propose to initiate a call right away if the computer 3 is equipped with VoIP applications such as Skype®.

Alternately, presence information 8 may be displayed in many other ways. For example, it may be displayed with a smiley code (a happy smiley meaning e.g. that the recipient terminal corresponding to the displayed URI is available, an unhappy smiley meaning, on the contrary, that it is not), or a color code (green color meaning e.g. that the recipient terminal is available, red color meaning, on the contrary, that it is not).

Figure 3:
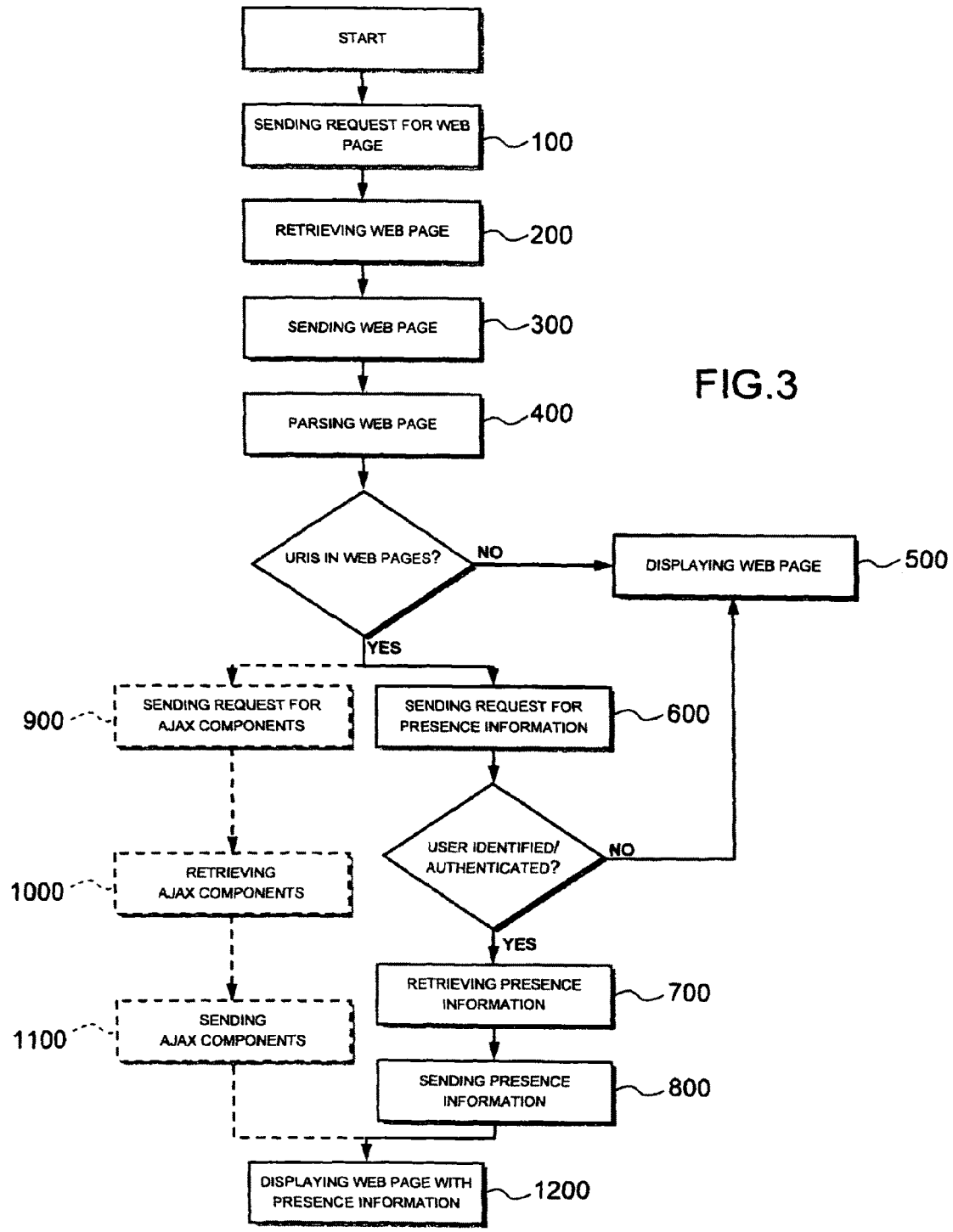
FIG. 3 is a flowchart illustrating a method for enriching content of a web page.

The method for enriching content of a web page displayed for a user on the computer 3 through the web browser 4 and communication system 1 is now disclosed with reference to FIG. 3.

After the user has inputted the URL of the web page 2 he wishes to access to (or clicked to a hyperlink pointing thereto), the web browser 4 sends (100) a request for the web page 2 to the web server 6.

Upon receipt of the request from the web browser 4, the web server 6 retrieves (200) the requested web page 2 and sends it back (300) to the web browser 4.

Upon receipt of the web page 2 from the web server 6, the web browser 4 parses (400) the web page 2 for contact information, e.g. in the form of URIs.

If the web page 2 contains no contact information, the web browser 4 simply displays (500) the downloaded web page 2.

On the contrary, upon detection of contact information within the web page 2, such as at least one URI, the web browser 4 sends (600) a request for presence information associated with the detected contact information, to the corresponding presence server 7. Of course, if several contact information elements (e.g. several URIs) are present in the web page 2, pointing to different presence servers 7, the web browser 4 sends a request for presence information to each of the presence servers 7.

The or each presence server 7 retrieves (700) the requested presence information 8, which may have been previously implemented on the database 9 by the users of the recipient terminals corresponding to the detected contact information.

However, before undertaking such action, the or each presence server 7 may first check identity and/or authorization of the user associated with the computer 3.

Identity may be simply checked by reading the IP address of the computer 3 sent by the web browser 4 when requesting the presence information, and comparing it with a memorized list of IP address.

Authentication, i.e. checking that the user is authorized to access the presence information 8, may be achieved through a classic login/password procedure, which may be either repeated each time presence information 8 is requested, whereby the user is requested to input login and password in a popup window, or programmed within the web browser 4 so that login and password are inputted once and for all at installation or first use of the web browser 4. In such a configuration, login and password are provided automatically by the web browser 4 to the presence server(s) 7 when requested.

If the user has been positively authenticated, the presence server 7 retrieves (700) the presence information and sends it (800) to the web browser 4.

By the time the web browser 4 sends the presence server 7 the request for presence information, the web browser 4 may connect to the AJAX server 10, requesting (900) for suitable AJAX components, in order to allow dynamic display of the presence information 8 within the web page 2, as disclosed hereabove in reference to FIG. 2. The AJAX server 10 retrieves (1000) the requested AJAX components and sends them (1100) to the web browser 4.

Upon receipt of the presence information 8 from the presence server(s) 7, and provided that the user has been positively authenticated, the web browser 4 displays (1200) the web page 2 on the computer 3 together with the presence information 8. If on the contrary the user was not authenticated (e.g. the login and/or password are erroneous), the web browser 4 may display within the web page 2 a notification that the presence information is not accessible and/or that the user is not authorized.

As a result of all described features, users are allowed to access presence information (when available) in ordinary web pages 2 memorized on ordinary (or legacy) web servers 6. Accordingly, there is no need for changing the structure of existing networks, provided that presence information 8 are accessible in servers connected thereto, such as in IMS presence servers as disclosed hereinbefore.

The invention claimed is:

1. Method for enriching content of a web page displayed for a user on a computer connected to a computerized network and provided with a web browser, said method comprising:
   the web browser sending a request for a web page to a distant web server,
   upon receipt of the web page from the web server, the web browser parsing the web page for contact information,
   upon detection of contact information within the web page, the web browser sending a request for presence information associated with said contact information to at least one presence server,
   upon receipt of the presence information from the presence server(s), the web browser displaying the web page on the computer together with the presence information.

2. Method according to claim 1, wherein the contact information within the web page is in the form of at least one URI.

3. Method according to claim 1, further comprising, if the contact information in the web page is not in the form of URI(s), the web browser forming URI(s) based upon said contact information, for inclusion in the request for presence information to be sent to the presence server(s).

4. Method according to claim 2, wherein the URI is selected from the group consisting of SIP URI, email address and telephone number.

5. Method according to claim 1, further including the presence server(s) identifying the user before sending the presence information.

6. Method according to claim 1, further including the presence server(s) authenticating the user before sending the presence information.

7. Method according to claim 6, further including, if the user is not authenticated, the web browser displaying within the web page a notification that the presence information is not accessible.

8. Computer program implemented on a non-transitory computer-readable medium, said program including computer executable instructions comprising:
   sending a request for a web page to a distant web server,
   upon receipt of the web page from the web server, parsing the web page for Uniform Resource Identifiers (URIs),
   upon detection of contact information within the web page, sending a request for presence information associated with said contact information to at least one presence server,
   upon receipt of the presence information from the presence server(s), displaying the web page on the computer together with the presence information.

9. A communication system configured for displaying enriched web pages, said system including:
   a computer provided with a web browser,
   a distant web server including at least one web page,
   at least one distant presence server including presence information, wherein the web browser is configured for:
   sending a request for a web page to the web server,
   upon receipt of the web page from the web server, parsing the web page for contact information,
   upon detection of contact information within the web page, sending a request for presence information associated with said contact information to at least one presence server,
   upon receipt of the presence information from the presence server(s), displaying the web page on the computer together with the presence information.

10. A communication system according to claim 9, further including an AJAX server, and wherein said web browser is Javascript-enabled and configured for sending the AJAX server a request for AJAX components enabling dynamic display of the presence information within the web page.

* * * * *